(12) United States Patent
Brown et al.

(10) Patent No.: US 8,091,119 B2
(45) Date of Patent: Jan. 3, 2012

(54) IDENTITY BASED NETWORK MAPPING

(75) Inventors: Jeremy Ray Brown, Orem, UT (US);
Lloyd Leon Burch, Payson, UT (US)

(73) Assignee: Novell, Inc., Provo, UT (US)

( * ) Notice: Subject to any disclaimer, the term of this patent is extended or adjusted under 35 U.S.C. 154(b) by 933 days.

(21) Appl. No.: 11/843,008

(22) Filed: Aug. 22, 2007

(65) Prior Publication Data
US 2009/0055531 A1   Feb. 26, 2009

(51) Int. Cl.
G06F 7/04 (2006.01)
G06F 17/30 (2006.01)
G06F 15/16 (2006.01)
G06F 15/173 (2006.01)
H04J 1/00 (2006.01)
H04L 9/30 (2006.01)
G07B 17/00 (2006.01)

(52) U.S. Cl. .............. 726/4; 726/8; 726/27; 709/218; 709/224; 709/225; 370/480

(58) Field of Classification Search .............. 726/4, 8, 726/27; 709/218, 224, 225; 370/480
See application file for complete search history.

(56) References Cited

U.S. PATENT DOCUMENTS

| | | | |
|---|---|---|---|
| 5,754,767 A | 5/1998 | Ruiz | |
| 6,085,030 A | 7/2000 | Whitehead et al. | |
| 6,131,119 A | 10/2000 | Fukui | |
| 6,292,838 B1 | 9/2001 | Nelson | |
| 6,377,987 B1 | 4/2002 | Krarcht | |
| 6,442,144 B1 | 8/2002 | Hansen et al. | |
| 6,728,232 B2 | 4/2004 | Hasty, Jr. et al. | |
| 6,782,436 B1 | 8/2004 | Baker | |
| 6,973,494 B2 | 12/2005 | Weisser, Jr. et al. | |
| 6,993,653 B1 | 1/2006 | Guski et al. | |
| 7,024,476 B1 | 4/2006 | Page et al. | |
| 7,152,108 B1 | 12/2006 | Khan et al. | |
| 7,370,351 B1 * | 5/2008 | Ramachandran et al. | 726/4 |
| 7,509,672 B1 * | 3/2009 | Horwitz et al. | 726/8 |

(Continued)

FOREIGN PATENT DOCUMENTS

WO   WO 2006051517 A1 *   5/2006

OTHER PUBLICATIONS

Karthikeyan Bhargavan, Ricardo Corin, Cédric Fournet, Andrew D. Gordon; "Secure sessions for Web services"; May 2007; Transactions on Information and System Security (TISSEC), vol. 10 Issue 2; Publisher: ACM; pp. 1-46.*

(Continued)

*Primary Examiner* — Eleni Shiferaw
*Assistant Examiner* — Courtney Fields
(74) *Attorney, Agent, or Firm* — Schwegman, Lundberg & Woessner, P.A.

(57) ABSTRACT

Techniques for identity-based network mapping are provided. A principal is associated with a resource identifier via a mapping. Conditions of a network are dynamically evaluated in response to policy and actions taken against a resource associated with the resource identifier of the mapping. The principal and the hardware resource of a machine are associated with two different types of resources and the mapping is used to manage security and maintenance associated with a network for shutting down the principal from accessing the network when an issue is detected with the hardware resource and the hardware resource is shut down when the issue is with the principal.

24 Claims, 3 Drawing Sheets

U.S. PATENT DOCUMENTS

| | | |
|---|---|---|
| 2003/0174841 A1 | 9/2003 | Nault et al. |
| 2005/0068983 A1* | 3/2005 | Carter et al. ............. 370/480 |
| 2005/0124320 A1 | 6/2005 | Ernst et al. |
| 2005/0243369 A1 | 11/2005 | Goldstein et al. |
| 2005/0253717 A1 | 11/2005 | Howarth et al. |
| 2006/0059565 A1* | 3/2006 | Green et al. ............... 726/27 |
| 2006/0159087 A1 | 7/2006 | Ono |
| 2007/0124820 A1 | 5/2007 | Burch et al. |
| 2007/0136265 A1 | 6/2007 | Hunt et al. |

OTHER PUBLICATIONS

Kinser, Stephen H., et al., "Identify Validation", U.S. Appl. No. 11/444,945, filed Jun. 1, 2006, 23 pgs.

* cited by examiner

IDENTITY BASED NETWORK MAPPING

BACKGROUND

When an enterprise has a machine that is spreading viruses on the network, the enterprise has to step through a series of tedious steps and take up a lot of everyone's time so that the enterprise can check all machines on the network for the problem machine. This is done in hopes that an administrator can find the machine that may be causing the problem. If the administrator knows that it is one particular machine causing the problem, then the administrator can go to each person asking if they know the machine in question. If the Internet Protocol (IP) being used is Dynamic Host Configuration Protocol (DHCP), then the administrator may never be able to find the culprit.

Moreover, if someone inadvertently enables DHCP on a network then the entire network is effectively disabled for anyone wanting to get a valid address and access to the network. Furthermore, the steps taken for finding this machine and for disabling it quickly are similar to the ones for finding a machine that is spreading viruses.

When an administrator has a machine that has been compromised in the enterprise's network and which only has a Media Access Control (MAC) address to know where the machine might be located, then the administrator has to search through every machine in the office trying to locate the problem.

Thus, what is needed is a mechanism, which allows for improved security tracking of assets within networks.

SUMMARY

In various embodiments, techniques are provided for identity-based network mapping. A method is provided for mapping a principal identity to a resource. More specifically, a principal identity for a principal is acquired. A unique resource identifier is captured for purposes of associating with the principal identity. The principal identity and the resource identifier are mapped to one another and the mapping is used for managing security and maintenance associated with a network.

DETAILED DESCRIPTION

A "resource" includes a user, content, a processing device, a node, a service, an application, a system, a schema definition, a directory, an operating system (OS), a file system, a data store, a database, a policy definition, a machine (processing environment), a configuration definition, a file, content, a World-Wide Web (WWW) service, a WWW page, groups of users, a digital certificate, an attestation, combinations of these things, etc. The terms "service," "application," and "system" may be used interchangeably herein and refer to a type of software resource that includes instructions, which when executed by a machine performs operations that change the state of the machine and that may produce output.

A "principal" is a special type of resource that performs one or more actions against other resources. So a principal may be a user or an automated service.

An "identity service" refers to a special type of service that is designed to manage and supply authentication services and authentication information for resources. So, an identity service may authenticate a given resource for access to a variety of local and external services being managed by that identity service. A single resource may have multiple identity services. In addition the identity service itself may be viewed as a type of resource. In this manner, identity service may authenticate and establish trust with one another viewing one another as specific type of resource.

According to an embodiment, some example identity services are described in "Techniques for Dynamically Establishing and Managing Authentication and Trust Relationships," filed on Jan. 27, 2004, and having the U.S. Ser. No. 10/765,523; "Techniques for Establishing and Managing a Distributed Credential Store," filed on Jan. 29, 2004, and having the U.S. Ser. No. 10/767,884; and "Techniques for Establishing and Managing Trust Relationships," filed on Feb. 3, 2004, and having the U.S. Ser. No. 10/770,677; all of which are commonly assigned to Novell, Inc., of Provo, Utah and the disclosures of which are incorporated by reference herein.

An identity service may also provide single sign-on services to a resource. That is, a resource may sign-on to an identity service and acquire identities and credentials to access a variety of other services or resources. In some cases, the identity service is modified or enhanced to perform some of the teachings presented herein and below.

A resource is recognized via an "identity." An identity is authenticated via various techniques (e.g., challenge and response interaction, cookies, assertions, etc.) that use various identifying information (e.g., identifiers with passwords, biometric data, hardware specific data, digital certificates, digital signatures, etc.). A "true identity" is one that is unique to a resource across any context that the resource may engage in over a network (e.g., Internet, Intranet, etc.). However, each resource may have and manage a variety of identities, where each of these identities may only be unique within a given context (given service interaction, given processing environment, given virtual processing environment, etc.).

The identity may also be a special type of identity that the resource assumes for a given context. For example, the identity may be a "crafted identity" or a "semantic identity." An example for creating and using crafted identities may be found in U.S. patent application Ser. No. 11/225,993; entitled "Crafted Identities;" filed on Sep. 14, 2005; and the disclosure of which is incorporated by reference herein. An example for creating and using semantic identities may be found in U.S. patent application Ser. No. 11/261,970; entitled "Semantic Identities;" filed on Oct. 28, 2005; and the disclosure of which is incorporated by reference herein.

Various embodiments of this invention can be implemented in existing network architectures, security systems, data centers, gateways, routers, bridges, proxies (reverse, transparent, and/or forward) and/or other network communication devices. Any particular architectural layout or implementation presented herein is provided for purposes of illustration and comprehension only and is not intended to limit aspects or embodiments of the invention.

It is within this context, that various embodiments of the invention are now presented with reference to the FIGS. 1-4.

Figure 1:
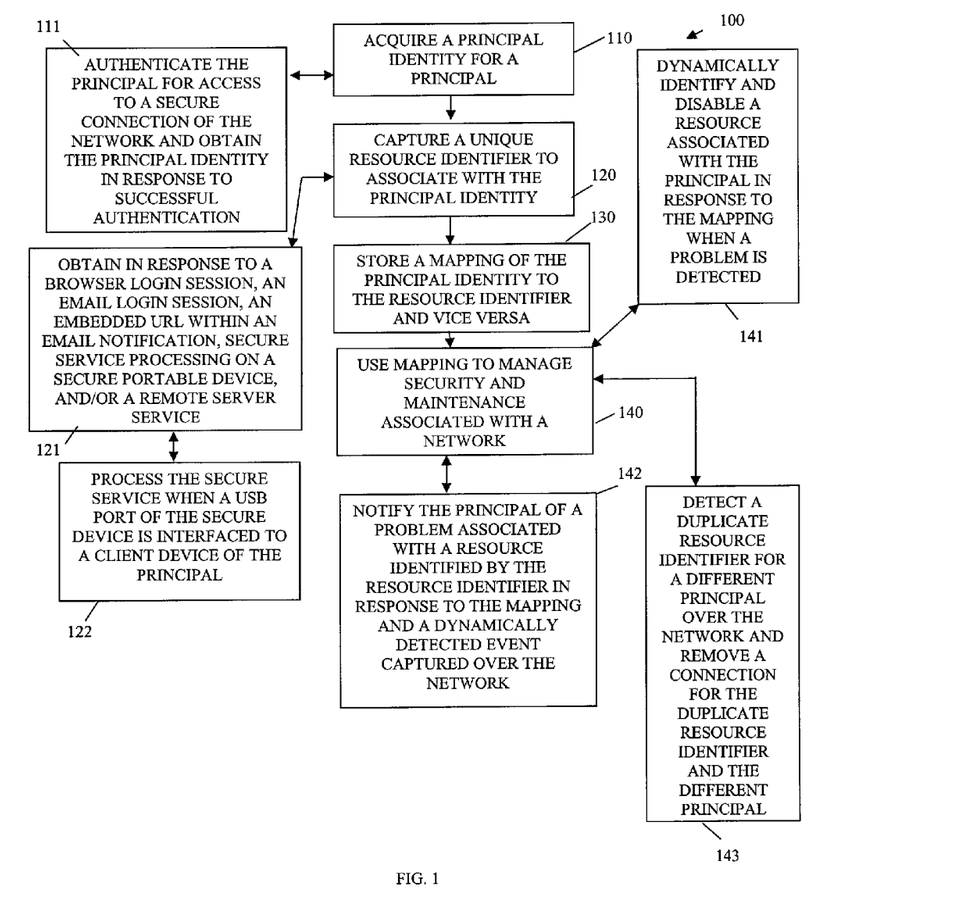
FIG. 1 is a diagram of a method for mapping a principal identity to a resource, according to an example embodiment.

FIG. 1 is a diagram of a method 100 for mapping a principal identity to a resource, according to an example embodiment. The method 100 (hereinafter "resource mapping service") is implemented as instructions in a machine-accessible and readable medium. The instructions when executed by a machine perform the processing depicted in FIG. 1. The resource mapping service is also operational over and processes within a network, such as a LAN network configuration. The network may be wired, wireless, or a combination of wired and wireless.

The resource mapping service permits different types of resources, such as a principal and a hardware resource to be associated with one another and mapped to one another. In this manner, when activity of one of the resources becomes an issue the other resource can be shut down or dealt with in a configurable manner according to policy.

At 110, the resource mapping service acquires a principal identity for a principal. The principal identity is a unique electronic identity associated with a particular principal. The identity can be acquired in a variety of manners.

For example, at 111, the resource mapping service authenticates a principal for access to a secure network communication session. The principal identity is obtained in response to successful authentication of the principal.

It may also be that an attestation supplies an identity for a principal. In another case, a third-party service, such as an identity service supplies the principal identity to the resource mapping service.

At 120, the resource mapping service dynamically and automatically captures a unique resource identifier, which is to be associated with the principal identity. The resource for which the resource identifier is associated may be a hardware resource, such as a particular machine (computing device, etc) or a software resource, such as license for a software service, etc. The resource identifier can be captured in a variety of manners.

For example, at 121, the resource mapping service can obtain the resource identifier in response to browser login session initiated with the resource mapping service. In another case, the resource identifier can be acquired automatically when the principal logs into an email service. In yet another situation, the resource identifier can be acquired when the principal activates an embedded Uniform Resource Locator (URL) link included within an email notification message sent to the principal.

In still another case, at 122, the resource identifier is received automatically by a secure device that is interfaced to a client device associated with the principal (such as a Universal Serial Bus (USB) connection). The secure device includes a software service that captures the resource identifier, such as a MAC address, for the client device and automatically communicates the resource identifier over a network connection to the resource mapping service. In another situation, a remote service over the network contacts a client device of the principal and acquires its resource identifier to associate with the principal.

At 130, the resource mapping service stores a mapping associated with the resource identifier and the principal identity and vice versa. The mapping may be housed by a third-party service and acquired via proper credentials on demand or may be housed in a repository for subsequent usage.

At 140, the resource mapping service uses the mapping to manage security and maintenance associated with the network and activity of the network.

For example, at 141, the resource mapping service may dynamically and automatically identify and disable a resource associated with the principal identity in response to a problem being detected. So, if a virus is detected as originating on a particular resource or from a particular principal, the mapping can confirm the association to the resource via the resource identifier and can shut down and remove all access to the resource from the network. This can help minimize the problems associated with the virus and can help immediately isolate it from others on the network. The mapping permits the resource to be readily identified and removed from the network.

In another situation, at 142, the resource mapping service can notify the principal having the principal identifier when a problem is detected and is associated with the resource. So, a warning message can be sent to the principal associated with the resource that is having network performance or security issues. A message may also be sent when an event determines that the resource needs some type of service or upgrade. So, the message does not always have to be associated with a problem; it may also be associated with normal or suggested maintenance.

In yet another case, at 143, the resource mapping service may detect that a duplicate resource identifier is located and active on the network. This can occur with a wireless network. The principal identity associated with a particular duplicate instance of the resource identifier may not match what is known to the resource mapping service and in such a case that instance of the resource can be removed from the network. This can help prevent rogue processes and connections to the network. So a invalid principal identity and resource identifier combination can be dynamically detected and removed from the network using the mapping.

In fact, a variety of actions may be automatically taken in response to policy once a valid principal identity is mapped to a specific resource identifier. One obvious application of this is to assign a specific MAC address of a client machine associated with a particular principal to a principal via that principal's identity. However, as was discussed above other mappings may be kept as well that are associated with software resources, such as software licenses for services.

Figure 2:
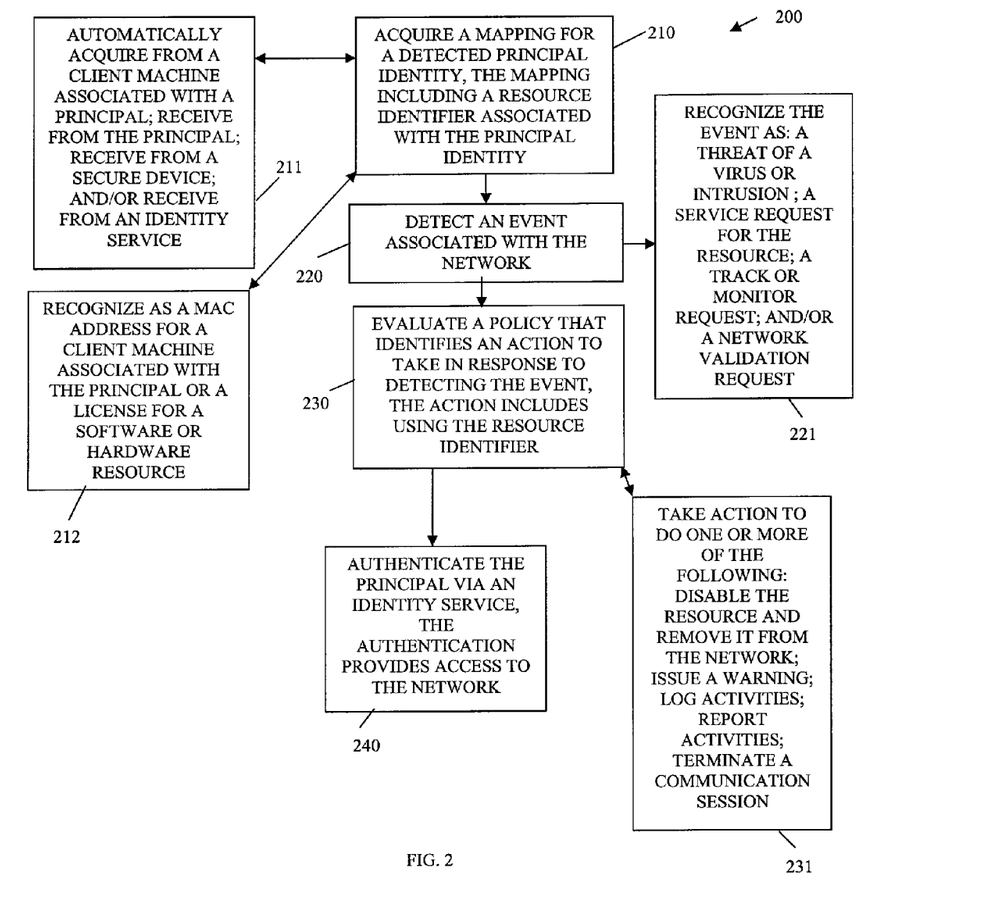
FIG. 2 is a diagram of another method for mapping a principal identity to a resource, according to an example illustration.

FIG. 2 is a diagram of another method 200 for mapping a principal identity to a resource, according to an example illustration. The method 200 (hereinafter "mapping service") is implemented as instructions in a machine-accessible and readable medium and is accessible over a network. The network may be wired, wireless, or a combination of wired and wireless.

The mapping service represents an alternative perspective and in some cases an enhanced perspective of the resource mapping service represented by the method 100 of the FIG. 1.

At 210, the mapping service acquires a mapping for a detected principal identity. The mapping includes a resource identifier for a resource and a principal identity for a particular principal. The mapping can be automatically constructed one the resource identifier and the principal identity are known. These can be acquired in a variety of manners.

For example, at 211, the mapping service can automatically acquire the resource identifier from a client machine associated with the principal. The resource mapping service can receive the resource identifier from the principal via some interaction, such as via a login session associated with a World-Wide Web (WWW) browser, and email service, etc. The resource identifier may also be acquired from a secure device that once interfaced to a client device associated with the principal automatically reports back the resource identifier of the client device to the resource mapping service. In still another situation, a remote secure service processing over a network may contact the client device or process on the client device and acquire a resource identifier for the client device. In still another case, the resource identifier is acquired from an identity service, such as the identity services described and incorporated by reference herein and above.

In an embodiment, at 212, the mapping service recognizes the resource identifier as a Media Access Control (MAC) address for a client machine associated with the principal. In another embodiment, at 212, the mapping service recognizes the resource identifier as a software license or hardware license for a software or hardware resource.

At 220, the mapping service detects an event associated with some activity of the network. The events that are detected may be raised automatically by triggers embedded in services of the network or may be defined and detected by monitoring the actions of the services. The event can detect a variety of situations.

For example, at 221, the mapping service detects the event as a threat of a potential virus or potential unwanted network intrusion. In another case, the event is detected as service request for the resource; such that the resource may need scheduled maintenance, upgrades, etc. The event may also be detected as a tracking or monitoring request; such that actions of the resource or the principal are to be tracked or monitored while on the network. In yet another situation, the event may be detected as network validation request; such that the mapping of the principal identity and the resource identifier is to be validated before the principal and the resource is to remain active on the network.

At 230, the mapping service evaluates a policy that identifies an action to take in response to detecting the event. The action includes using the resource identifier to perform some activity. A variety of actions may be taken in response to dictates of the policy.

For example, at 231, the mapping service can disable the resource using the resource identifier and remove it entirely from the network. In another case, the mapping service issues one or more warnings to administrators, the principal or other interested parties in response to the policy evaluation. In yet another situation, the mapping service logs activities or reports activities taken by the principal or the resource while on the network. The mapping service can also terminate a communication session associated with the principal and the resource in response to the policy evaluation. This may be useful when duplicate resource identifiers are detected as being active on the network.

According to an embodiment, the mapping service uses a trusted third-party service, such as an identity service to initially authenticate the principal for access to the network connection. The authentication provides the principal identity. In some cases, the identity service may also store and supply the resource identifier and thus the mapping associated with the principal to a particular resource.

It is now appreciates how resource identifiers and principals may be mapped on a network. This mapping permits automated processing and recognition of resources and principals when some action defined by policy is needed on either the principal or the resource associated with the mapping.

Figure 3:
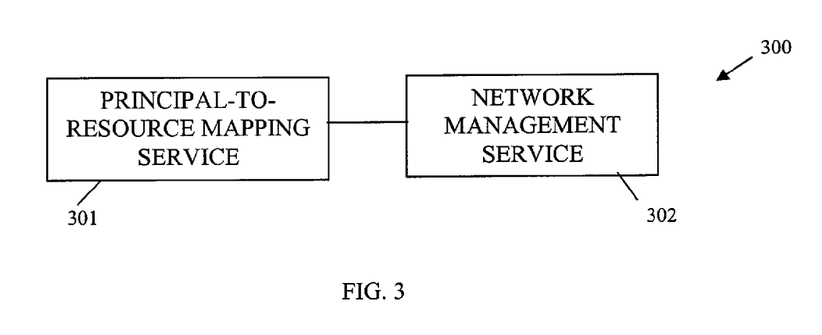
FIG. 3 is a diagram of a principal-to-resource mapping system, according to an example embodiment.

FIG. 3 is a diagram of a principal-to-resource mapping system 300, according to an example embodiment. The principal-to-resource mapping system 300 is implemented in a machine-accessible and readable medium as instructions. The instructions when executed by a machine perform the processing described herein and below. Moreover, the principal-to-resource mapping system 300 is operational over a network, such as a wide-area network (WAN) (e.g., Internet, etc.). The network may be wired, wireless, or a combination of wired and wireless. The principal-to-resource mapping system 300 implements the processing depicted in the methods 100 and 200 of the FIGS. 1 and 2, respectively.

The principal-to-resource mapping system 300 includes a principal-to-resource mapping service 301 and a network management service 302. Each of these and their interactions with one another will be discussed in turn.

The principal-to-resource mapping service 301 is implemented in a machine-accessible and readable medium and is to process as instructions on a machine. The principal-to-resource mapping service 301 establishes and maintains a mapping between a principal and a resource via a principal identity and a resource identifier.

According to an embodiment, the principal-to-resource mapping service 301 acquires the mapping or at least the resource identifier via dynamic interaction with a principal, who is associated with the principal identifier.

In another case, the principal-to-resource mapping service 301 acquires the mapping via dynamic interaction associated with a WWW browser login session, an email login session, a secure device associated with a client device or machine of the principal, and/or a remote server service.

The principal identity can be acquired from an authentication process, such as via interaction with an identity service or via an attestation or some other attribute associated with the principal that is processing on the network. Once the principal identity is known then the principal-to-resource mapping service 301 can acquire the resource identifier for a particular resource to associate with the mapping in the manners discussed above.

The network management service 302 is implemented in a machine-accessible and readable medium and is to process as instructions on a machine. The network management service 302 uses the mapping to take actions on or against the resource in response to policy. Example processing associated with taking actions in response to policy was described in detail above with reference to the mapping service represented by the method 200 of the FIG. 2.

According to an embodiment, the network management service 302 is to process actions for: blocking the resource from being accessible from a network connection, performing maintenance on the resource, tracking activities of the resource on the network connection, and detecting duplicate instances of the resource on the network connection.

It is also noted that the network management service 302 can take actions on the principal similar to actions taken against the resource. This too may be done in response to policy evaluation. In fact, some actions may be taken on both the resource and the principal.

It is now appreciated how the dynamic association of a principal via a principal identity and a particular resource (such as a computing device via a MAC address) can be maintained as a mapping. That mapping can be accessed in response to policy evaluations to perform automated actions on or against both the principal and the resource or on just the principal or just the resource.

Figure 4:
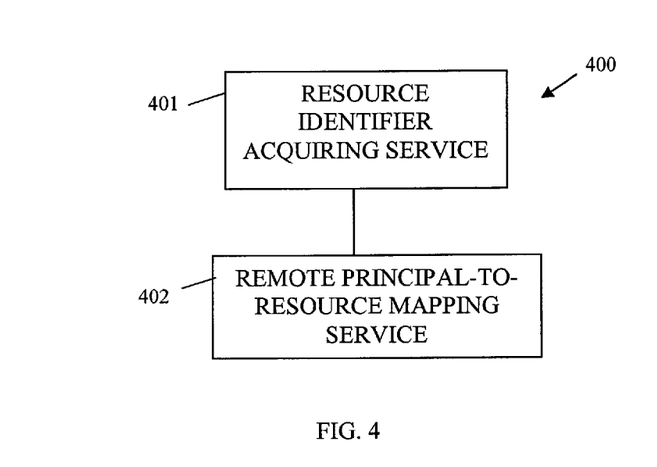
FIG. 4 is a diagram of another principal-to-resource mapping system, according to an example illustration.

FIG. 4 is a diagram of another principal-to-resource mapping system 400, according to an example illustration. The principal-to-resource mapping system 400 is implemented as instructions within a machine-accessible and readable medium and is to process on a machine of a network. The network may be wired, wireless, or a combination or wired and wireless. The principal-to-resource mapping system 400 implements, among other things, the methods 100 and 200 of the FIGS. 1 and 2, respectively, and the system 300 of the FIG. 3. The principal-to-resource mapping system 400 represents an alternative perspective to the system 300 of the FIG. 3.

The principal-to-resource mapping system 400 includes a resource identifier acquiring service 401. This along with other components that interact with the principal-to-resource mapping system 400 are now discussed in turn.

The resource identifier acquiring service 401 is implemented in a machine-accessible and readable medium and is to process on a machine of the network.

The resource identifier acquiring service 401 processes on a secure device and is to automatically acquire a resource identifier for a machine when interfaced to that machine and dynamically reports the resource identifier to a remote principal-to-resource mapping service 402. The remote principal-to-resource mapping service 402 establishes a mapping for a principal associated with a principal identifier and the resource identifier that is associated with the machine.

In other words, the resource identifier acquiring service 401 processes on a secure device. The secure device when dynamically connected to a client machine for a principal, such as a computer via a USB connection, automatically initiates the resource identifier acquiring service 401 for processing. The resource identifier acquiring service 401, when initiated, acquires a MAC address for the client computer/machine and reports it over a network connection to the remote principal-to-resource mapping service 402.

Example processing associated with the remote principal-to-resource mapping service 402 was described in detail above with reference to the methods 100 and 200 of the FIGS. 1 and 2, respectively, and with respect to the system 300 of the FIG. 3.

In some cases, the resource identifier acquiring service 401 automatically authenticates a principal via an identity service once initiated on the secure device.

The resource identifier acquiring service 401 may also be used to interact with the remote principal-to-resource mapping service 402 for purposes of enforcing some policies. So, the resource identifier acquiring service 401 may receive instructions from the remote principal-to-resource mapping service 402 to terminate a network connection of the client machine. The resource identifier acquiring service 401 may also establish a secure network communication session with the remote principal-to-resource mapping service 402.

So, some processing discussed above with respect to the remote principal-to-resource mapping service 402 can be distributed and enforced locally against a particular principal's machine via the resource identifier acquiring service 401. This can be done via dynamic policy being pushed from the remote principal-to-resource mapping service 402 to the resource identifier acquiring service 401 or policy or instruction being acquired from the remote principal-to-resource mapping service 402 of via another trusted third-party service, such as an identity service.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method implemented in a non-transitory machine-readable medium and to execute on a machine, comprising:
   acquiring, by the machine, a principal identity for a principal;
   capturing, by the machine, a unique resource identifier to associate with the principal identity, captured automatically via interaction with the principal, the unique resource identifier associated with a hardware resource being used by the principal, the principal is a different type of resource from that which is associated with the hardware resource;
   storing, by the machine, a mapping of the principal identity to the resource identifier and the resource identifier to the principal identity by contacting a third-party service and presenting credentials, the third-party service housing the mapping; and
   using, by the machine, the mapping to manage security and maintenance associated with a network, and the principal is shut down from access when an issue is detected with the hardware resource and the hardware resource is shut down when the issue is with the principal.

2. The method of claim 1, wherein acquiring further includes, authenticating the principal for access to a secure connection of the network and obtaining the principal identity in response to successful authentication.

3. The method of claim 1, wherein capturing further includes:
   obtaining the resource identifier in response to a browser login session of the principal;
   obtaining the resource identifier in response to an email login session of the principal;
   obtaining the resource identifier in response to an embedded Uniform Resource Locator (URL) within an email notification and which is activated by the principal;
   obtaining the resource identifier in response to a secure service processing on a secure portable device interfaced to a client device of the principal; and
   obtaining the resource identifier in response to a remote server service that contacts the client device of the principal for the resource identifier.

4. The method of claim 3, wherein obtaining the resource identifier further includes automatically processing the secure service when a universal serial port (USB) connection is made between the secure portable device and the client device, and wherein the secure service reports over the network the resource identifier of the client device.

5. The method of claim 1, wherein using further includes dynamically identifying and disabling a resource associated with the principal in response to the mapping when a problem is detected.

6. The method of claim 1, wherein using further includes dynamically notifying the principal of a problem associated with a resource identified by the resource identifier in response to the mapping and a dynamically detected event captured over the network.

7. The method of claim 1, wherein using further includes detecting a duplicate resource identifier for a different principal on the network and removing a connection of the duplicate resource identifier and the different principal.

8. A method implemented in a non-transitory machine-readable medium and to execute on a machine, comprising:
   acquiring, by the machine, a mapping for a detected principal identity, the mapping including a resource identifier associated with the principal identity and the resource identifier associated with a hardware resource being used by a principal associated with the principal identifier and the resource identifier automatically acquired via prior interactions with the principal, and the mapping and the resource identifier obtained from an identity service in response to supplying the principal identity to the identity service, the principal is a different type of resource from that which is associated with the hardware resource;

detecting, by the machine, an event associated with a network; and evaluating, by the machine, a policy that identifies an action to take in response to the event, wherein the action includes using the resource identifier, the principal is shut down when an issue is detected with the hardware resource and the hardware resource is shut down when the issue is with the principal.

9. The method of claim 8, wherein detecting further includes recognizing the event as one or more of the following:

a threat of a virus to the network associated with the resource identifier;

a service request that is to be performed on a resource associated with the resource identifier;

a track or monitor request that is to track activities associated with the resource and the principal associated with the principal identity; and a validation request that is to validate whether the resource identifier and principal identity pair is valid for the network.

10. The method of claim 8, wherein evaluating the policy further includes taking the action to perform one or more of the following:

disabling the resource and removing it from the network;

issuing a warning to a network administrator or the principal;

logging activities taken by the principal and the resource over the network;

reporting the activities to the network administrator;

terminating a communication session that permits the principal and the resource to process on the network.

11. The method of claim 8, wherein acquiring further includes recognizing the resource identifier as a media access control (MAC) address for a client machine associated with a principal who is identified by the principal identity.

12. The method of claim 8, wherein acquiring further includes recognizing the resource identifier as a license for a hardware device associated with the principal who is identified by the principal identity.

13. The method of claim 8 further comprising, authenticating a principal via an identity service to obtain the principal identity, wherein the authentication provides access to the network.

14. A system, comprising:

a principal-to-resource mapping service implemented in a machine-accessible medium and to process on a machine; and a network management service implemented within a machine-accessible medium and to process on the machine or a different machine, wherein the principal-to-resource mapping service is to establish and to maintain a mapping between a principal and a resource via a principal identity and a resource identifier and store the principal-to-resource mapping with a third-party service where it is acquired on demand by providing credentials for access, and wherein the network management service is to use the mapping to take actions on or against the resource in response to a policy, the resource identifier is for a hardware resource and is automatically acquired via interactions with the principal and the hardware resource is being used by the principal, the principal is a different type of resource from that which is associated with the hardware resource, the principal is shut down when an issue is detected with the hardware resource and the hardware resource is shut down when the issue is with the principal.

15. The system of claim 14, wherein the principal-to-resource mapping is to acquire the mapping via dynamic interaction with the principal.

16. The system of claim 15, wherein the dynamic interaction is achieved via a World-Wide Web (WWW) browser, a link in an email message, a login process, a secure device interfaced to a client device of the principal, or a remote server service.

17. The system of claim 14, wherein the network management service is to process actions for: blocking the resource from being accessible from a network connection, performing maintenance on the resource, tracking activities of the resource on the network connection, and detecting duplicate instances of the resource on the network connection.

18. The system of claim 14, wherein acquiring the principal identity from an identity service in response to an authentication procedure.

19. A system, comprising:

a resource identifier acquiring service implemented in a machine-accessible medium and to process on a machine;

wherein the resource identifier acquiring service is to process on a secure device and is to automatically acquire a resource identifier for a machine when interfaced to the machine and dynamically report the resource identifier to a remote principal-to-resource mapping service, the resource identifier acquiring service a third-party service to the remote principal-to-resource mapping service and the machine being used by a principal and automatically acquired via interactions via interactions with the principal, and wherein the remote principal-to-resource mapping service is to establish a mapping for the principal associated with a principal identifier and the resource identifier that is associated with the machine, the principal is a different type of resource from that which is associated with the machine, the principal is shut down when an issue is detected with the machine and the machine is shut down when the issue is with the principal.

20. The system of claim 19, wherein the resource identifier is a media access control (MAC) address for the machine.

21. The system of claim 19, wherein the secure device is a universal serial bus (USB) device that when connected to the machine is automatically recognized and causes the resource identifier acquiring service to process.

22. The system of claim 19, wherein the resource identifier acquiring service is to securely communicate with the remote principal-to-resource mapping service over the network.

23. The system of claim 19, wherein the resource identifier acquiring service is to terminate the machine's network connection in response to notification received from the remote principal-to-resource mapping service.

24. The system of claim 19, the resource identifier acquiring service is to authenticate the machine via an identity service before acquiring the resource identifier.

* * * * *

UNITED STATES PATENT AND TRADEMARK OFFICE
CERTIFICATE OF CORRECTION

Page 1 of 1

PATENT NO.        : 8,091,119 B2
APPLICATION NO.   : 11/843008
DATED             : January 3, 2012
INVENTOR(S)       : Jeremy R. Brown et al.

It is certified that error appears in the above-identified patent and that said Letters Patent is hereby corrected as shown below:

In column 10, line 36, in Claim 19, after "interactions" delete "via interactions".

In column 10, line 58, in Claim 24, after "claim 19," insert -- wherein --.

Signed and Sealed this
Twentieth Day of March, 2012

David J. Kappos
*Director of the United States Patent and Trademark Office*